(12) United States Patent
Chen et al.

(10) Patent No.: US 11,176,419 B1
(45) Date of Patent: Nov. 16, 2021

(54) METHOD FOR LABELING IMAGE

(71) Applicants: Inventec (Pudong) Technology Corporation, Shanghai (CN); INVENTEC CORPORATION, Taipei (TW)

(72) Inventors: Yi-Chun Chen, Taipei (TW); Trista Pei-Chun Chen, Taipei (TW); Daniel Stanley Young Tan, Taipei (TW); Wei-Chao Chen, Taipei (TW)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 9 days.

(21) Appl. No.: 16/905,013

(22) Filed: Jun. 18, 2020

(30) Foreign Application Priority Data

Jun. 5, 2020 (CN) .......................... 202010507192.0

(51) Int. Cl.
*G06K 9/62* (2006.01)

(52) U.S. Cl.
CPC .......... *G06K 9/6256* (2013.01); *G06K 9/6232* (2013.01); *G06K 9/6262* (2013.01); *G06K 2209/21* (2013.01)

(58) Field of Classification Search
None
See application file for complete search history.

(56) References Cited

U.S. PATENT DOCUMENTS

| | | | |
|---|---|---|---|
| 2018/0157937 A1* | 6/2018 | Kang ....................... G06K 9/66 |
| 2020/0364842 A1* | 11/2020 | Chaton ..................... G06N 3/08 |
| 2021/0209418 A1* | 7/2021 | Badanes .............. G06K 9/4628 |
| 2021/0232872 A1* | 7/2021 | Ries ......................... G06T 7/001 |

* cited by examiner

*Primary Examiner* — Vikkram Bali

(74) *Attorney, Agent, or Firm* — Locke Lord LLP; Tim Tingkang Xia, Esq.

(57) ABSTRACT

A method for labeling image comprises: obtaining a target image of a target object; generating a reconstruction image according to the target image and a reconstruction model, wherein the reconstruction model is trained with a plurality of reference images and a machine learning algorithm, each of the reference images is an image of a reference object whose defect level is in a tolerable range with an upper limit, and each of the reference objects is associated with the target object; generating a first difference image and a second difference image respectively by performing a first difference algorithm and a second difference algorithm respectively according to the target image and the reconstruction image; and generating an output image by performing a pixel-scale operation according to the first difference image and the second difference image, wherein the output image includes a label indicating a defect of the target object.

9 Claims, 4 Drawing Sheets

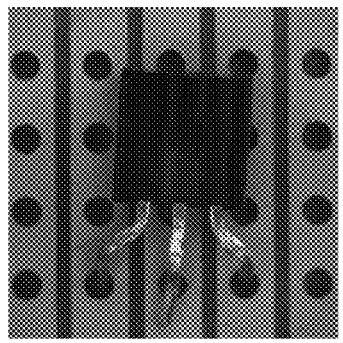
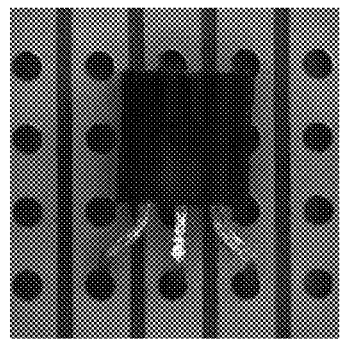
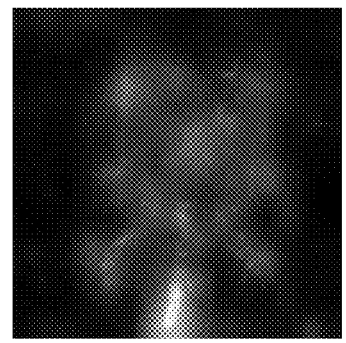
FIG. 4　　　　FIG. 5　　　　FIG. 6
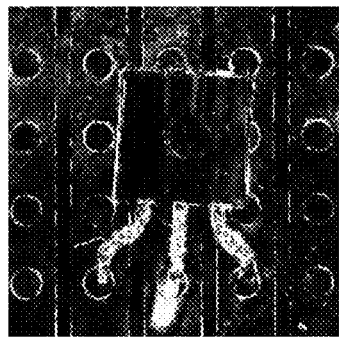
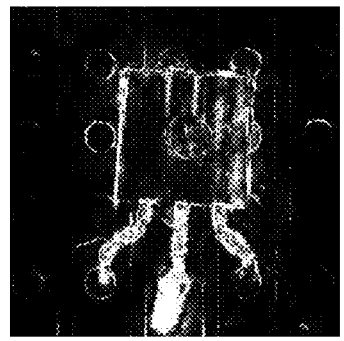
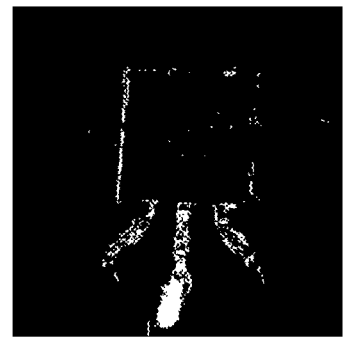
FIG. 7　　　　FIG. 8　　　　FIG. 9
FIG. 10　　　　FIG. 11　　　　FIG. 12

METHOD FOR LABELING IMAGE

CROSS-REFERENCE TO RELATED APPLICATIONS

This non-provisional application claims priority under 35 U.S.C. § 119(a) on Patent Application No(s). 202010507192 filed in China on Jun. 5, 2020, the entire contents of which are hereby incorporated by reference.

BACKGROUND

1. Technical Field

This disclosure relates to the field of image processing, and more particularly to a method for labeling a defect of an object in an image.

2. Related Art

Computers, such as laptops, tablets and the likes, need to be inspected and confirmed by quality control personnel before their final shipment to the customers. Such quality control personnel will check for scratches, dents, and other surface defects specified in an inspection-guideline documentation. If the severity of the surface defects is beyond what are allowed in the specification, the computer is then considered "failed", as opposite to "pass" in the surface defect detection test.

To detect computer appearance imperfections, it is possible to collect computer surface images, label them with defect types, and train deep learning (DL) model for inference in an automatic optical inspection (AOI) machine. Both object detection and classification are done in a supervised manner. In the case of supervised learning, conventional wisdom dictates that we collect more labeled training data, with both normal and defective samples, for better inference/testing accuracy.

More training data means more labeling work. However, training image collection and labeling require a lot of labors and can be hard due to several reasons. For example, manufacturing facilities where the computers are manufactured, are not equipped with infrastructure in collecting big data, especially large amount of image data. If such data collection and labeling tasks are outsourced, security, integrity, and confidentiality of the data can cause a great concern. More importantly, as computer life cycles become shorter and product designs become more diverse, it becomes impractical to collect and label computer surface images with sufficient diversity. Computer surface can come in any color and can come in any texture and material. In addition, there are many types of surface defects such as scratch, dent, smudge, etc. Surface defects of the same type can come in all shapes and sizes. To make matters worse, some surface defects cannot be easily categorized. There will be inevitably inconsistent labels in the training data. Conventional methods need the surface defects to be categorized/labeled correctly in the training data, in order to have good accuracy. Therefore, it's hard to collect a large amount of consistent labeled data with sufficient varieties. A product may be near the end of its lifecycle before enough training images are collected and labeled.

SUMMARY

Accordingly, this disclosure provides a method for labeling image to satisfy the requirement of a large amount of training data.

According to one or more embodiment of this disclosure, a method for labeling image comprising: obtaining a target image of a target object; generating a reconstruction image according to the target image and a reconstruction model, wherein the reconstruction model is trained with a plurality of reference images and a machine learning algorithm, each of the plurality of reference images is an image of a reference object, a defect level of the reference object is in a tolerable range with an upper limit, and each of the plurality of reference objects is associated with the target object; generating a first difference image and a second difference image respectively by performing a first difference algorithm and a second difference algorithm respectively according to the target image and the reconstruction image; and generating an output image by performing a pixel-scale operation according to the first difference image and the second difference image, wherein the output image includes a label indicating a defect of the target object.

In sum, the present disclosure proposes a method for labeling image works for both classification and detection in respect to the original image of the computer products. The present disclosure reduces the need of a large amount of (human-)labeled image data for training purposes. The present disclosure is not over-generalized so that it treats some defects as the texture pattern in normal regions. Therefore, the present disclosure reduces the false negative determinations (failing to spot abnormal samples or regions). The present disclosure mimics human perception by highlighting only anomaly while ignoring complex background, such perceptual-attention based method reduces false positives effectively.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein:

FIG. 4 is an example of a target image according to an embodiment of the present disclosure;

FIG. 5 is an example of a reconstruction image according to an embodiment of the present disclosure;

FIG. 6 is an example of a first difference image according to an embodiment of the present disclosure;

FIG. 7 is an example of a second difference image according to an embodiment of the present disclosure;

FIG. 8 is an example of a first output image according to an embodiment of the present disclosure;

FIG. 9 is an example of a third output image according to an embodiment of the present disclosure;

FIG. 10 is an example of a fourth output image according to an embodiment of the present disclosure;

FIG. 11 is an example of a second output image according to an embodiment of the present disclosure; and FIG. 12 is an example of a human-labeled defect in an image according to an embodiment of the present disclosure.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

A method for labeling image proposed by the present disclosure is suitable to detect a defect of a target object, and generate a supplementary labels associated with the defect in a target images having the target object. For an example, the target object is a surface of a computer product, such as a top cover of a laptop, and the defect is a scratch, a dent, a smudge, or the like on the top cover. For another example, the target object is a printed circuit board (PCB), and the defect is a missing component, a skew component, or a wrong component.

Figure 1:
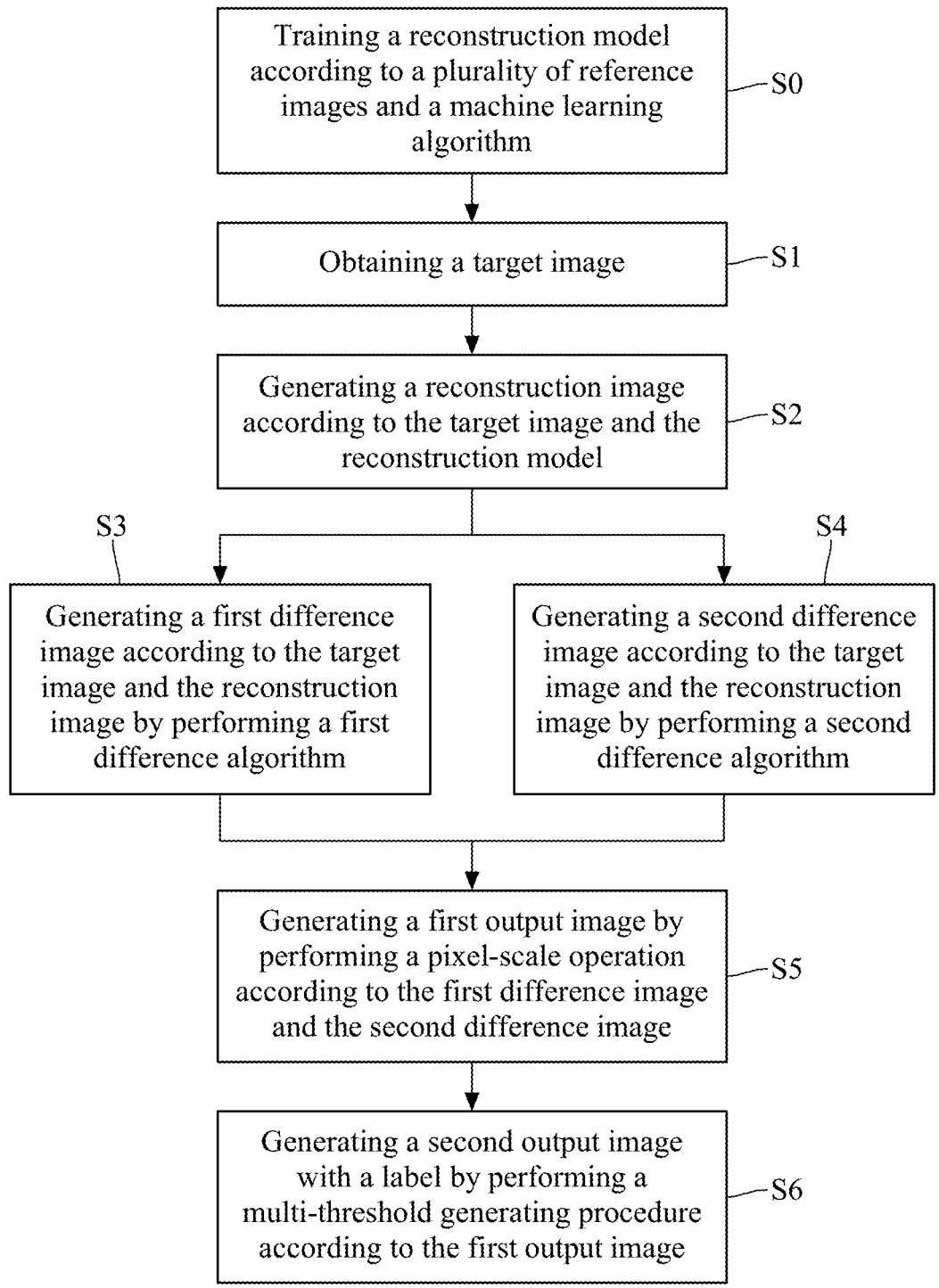
FIG. 1 is a flowchart of a method for labeling image according to an embodiment of the present disclosure.

Please refer to FIG. 1, which illustrates a flowchart of a method for labeling image according to an embodiment of the present disclosure. Please refer to step S0, "training a reconstruction model according to a plurality of reference images and a machine learning algorithm". Each of the plurality of reference images is an image of a reference object, and a defect level of the reference object is in a tolerable range with an upper limit, and each of the plurality of reference objects is associated with the target object. Specifically, the reference object is served as a normal sample of the target object, or is referred to as a tolerable sample. For example, the reference object is the top cover of the laptop. Based on the requirement of the product specification, the reference object does not have any defect, or the number and the level of defect of the reference object is in a tolerable range. Taking Table 1 for example, the tolerable range may be the defect types of the first and second levels whose upper limit includes maximal boundary values (20 mm, 2 scratches, 1 mm$^2$, and/or two dents) defined in level 2, or the tolerable range may be the defect type of the first level whose upper limit includes maximal boundary values (12 mm, 2 scratches, 0.7 mm$^2$, and/or three dents) defined in level 1. For the convenience of description, "the level of defect in a tolerable range" is referred to as "no defect".

TABLE 1

| Defect level | Level 1 | Level 2 | Level 3 |
| --- | --- | --- | --- |
| Scratch | Length: 12 mm | Length: 20 mm | Length: 25 mm |
|  | Acceptable: two | Acceptable: two | Acceptable: one |
| Dent | 0.5 mm$^2$-0.7 mm$^2$ | 0.5 mm$^2$-1 mm$^2$ | 1 mm$^2$-1.3 mm$^2$ |
|  | Acceptable: three | Acceptable: two | Acceptable: one |

In an embodiment, the machine learning algorithm of step S0 is auto-encoder. In another embodiment, the machine learning algorithm of step S0 is a one-class support vector machine (one-class SVM). The machine algorithm uses a plurality of reference images obtained by capturing a plurality of reference objects as the training data to train a reconstruction model. The reconstruction model, also known as "generative model", is a model to describe a normal sample. After step S0 is performed to pre-train the reconstruction model, steps S1-S5 are operating stage on the production line.

Please refer to step S1, "obtaining a target image". For example, this step S1 uses camera device to capture the target image of a target object. The target object is such as the top cover of the laptop or the printed circuit board. For the convenience of description, the target has one or more defects out of the tolerable ranges. However, the condition that "the target object does not have any defect" may occur after the method for labeling defect of the present disclosure is performed.

Please refer to step S2, "generating a reconstruction image according to the target image and the reconstruction model". For example, the camera device sends the target image obtained in step S1 to a processor. The processor generates a reconstruction image according to the target image and the reconstruction model. The reconstruction image is equivalent to "a target image without defect". The manners to generate the reconstruction image includes: selecting one from the plurality of reconstruction image candidates, generating the reconstruction image by a linear combination with a plurality of feature prototypes, or outputting the reconstruction image according to image converting function, however, the present disclosure is not limited to the above examples.

There is a reconstruction error between the reconstruction image and the target image after generating the reconstruction image in step S2 if the target object of the target image had a defect. Please refer to steps S3 and S4. Step S3 is that the processor generates a first difference image according to the target image and the reconstruction image by performing a first difference algorithm, and step S4 is that the processor generates a second difference image according to the target image and the reconstruction image by performing a second difference algorithm. The processor calculates reconstruction errors with different scales in steps S3 and S4. Steps S3 and S4 may be performed concurrently, or be performed sequentially. The present disclosure does not limit the order that the processor performs steps S3 and S4.

Figure 2:
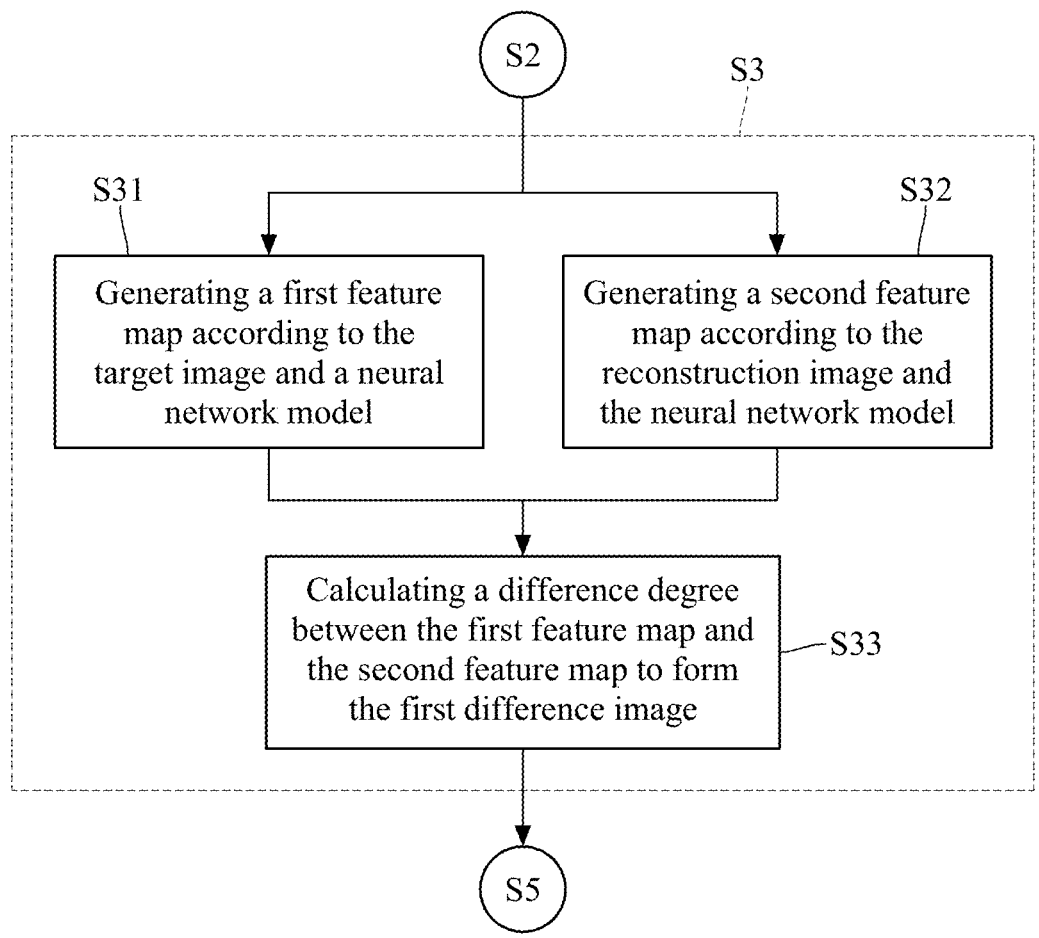
FIG. 2 is a detailed flowchart of step S2 in FIG. 1.

Please refer to FIG. 2, which illustrates a detailed flowchart of step S2 in FIG. 1

Please refer to steps S31 and S32. Step S31 refers to "generating a first feature map according to the target image and a neural network model", and step S32 refers to "generating a second feature map according to the reconstruction image and the neural network model". Each of the first and second feature maps has one or more feature blocks respectively, these feature blocks represent the parts of the feature map that should be noticed. For example, one feature block may be a rectangular patch whose length and width are 64 pixels. However, the present disclosure does not limit the size of the feature block. The feature map may be referred to as "deep feature".

In an embodiment, the neural network model used in steps S31 and S32 is such as SqueezeNet. In other embodiments, the neural network model is AlexNet or ResNet. In an embodiment, the neural network model is trained in advance with a plurality of images from a large visual database such as ImageNet, and the plurality of images is not associated with the target object. During a training process, every pixel of each image is used to crop out a rectangular block containing this pixel (such as a rectangular block with a length and width of 64 pixels) as the training data. Another embodiment firstly uses a plurality of images not associated with the target object to train the neural network model, and then use a plurality of images associated with the target object to fine-tune this neural network model so that improves the accuracy of feature extraction. The feature map outputted by the trained neural network model in the feature extraction stage is similar to the feature recognition policy of human visual perception.

Please refer to step S33, "calculating a difference degree between the first feature map and the second feature map to form the first difference image". For example, the first difference image is generated by subtracting the first feature map and the second feature map. The first difference image is a perceptual attention map which mimics how humans compare image patches. Specifically, when humans compare the reference image and the target image, they tend to observe difference with block-scale rather than slight shift or small difference. The first algorithm described in steps S31-33 calculates a coarse-level reconstruction error from an angle of block view.

In general, most auto-encoder use variants of the L2 distance metric or structural similarity index (SSIM) to compute the reconstruction error between the target image and reconstruction image. However, these metrics tend to be sensitive to slight global shifts and as a result, do not work well when our focus is on texture pattern similarity instead of exact alignment. Even the level of defect of the target object in the target image is not serious, if there is a small shift between the target image and the reconstruction image, the above metrics may bring unnecessary reconstruction error. Therefore, the present disclosure adopts the first difference algorithm introduced in steps S31-S33 to give more importance to match higher level structure and feature representations. In overall, the first difference image generated by applying the first difference algorithm have effects such as emphasizing the region of interest (ROI) and reducing the background noise.

Please refer to step S4, "generating a second difference image according to the target image and the reconstruction image by performing a second difference algorithm". The second difference algorithm is that the processor calculates a relative error between each pixel of the reconstruction image and a respective pixel of the target image. The relative error is a pixel-wise square error of every pixel in two images or a pixel-wise absolute error of every pixel in two images. The processor performs a pixel-level calculation in this step S4 to obtain defect positions of the target object in the target images.

Please refer to step S5, "generating a first output image by performing a pixel-scale operation according to the first difference image and the second difference image". In an embodiment, the pixel-scale operation is the bitwise multiplication. Specifically, in step S5, considering a position of the first difference image and the same position of the second difference image, if the processor determines that pixel values of these two positions indicate represent the defect, the first output image will keep the defect of this position. On the other hand, if the processor determines that pixel value of either the first difference image or the second difference image indicates the defect, the first output message will not keep the defect of this position.

In an embodiment, after the step S5 is performed, the processor may label the defect in the first output image according to whether each pixel in the first output image indicates a defect. In another embodiment, after the step S5 is performed, the processor may continue to perform step in order to further reduce the false positive condition and improve the label accuracy.

Please refer to step S6, "generating a second output image with a label by performing a multi-threshold generating procedure according to the first output image". The first threshold is greater than the second threshold. The first threshold is configured to obtain pixels possible to be defects, and the second threshold is configured to expand these pixels possible to be defects to pixels surrounding each of them.

Figure 3:
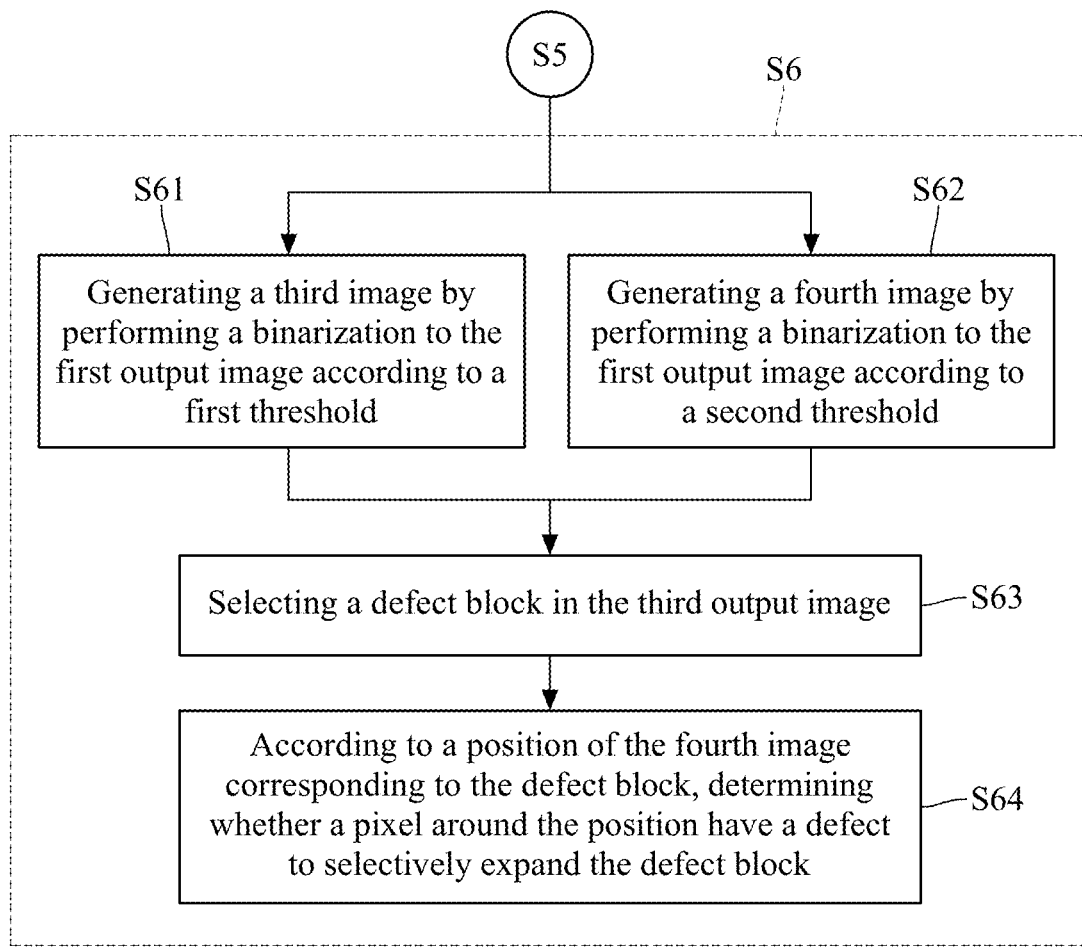
FIG. 3 is a flowchart of step S6 in FIG. 1.

Please refer to FIG. 3, which illustrates a flowchart of step S6 in FIG. 1. Please refer to steps S61 and S62. Step S61 is "generating a third image by performing a binarization to the first output image according to a first threshold", and step S62 is "generating a fourth image by performing a binarization to the first output image according to a second threshold". Steps S61 and S62 use different thresholds to process the first output image. Steps S61 and S62 may be performed concurrently, or be performed sequentially. The present disclosure does not limit the order that the processor performs steps S61 and S62. In an embodiment, the processor calculates an average A of reconstruction errors and standard deviation R from the plurality of reference images together with their reconstruction image, and the first threshold is set to A+4S, and the second threshold is set to A+S.

Please refer to step S63, "selecting a defect block in the third output image". Specifically, the third output image after processed according to a high threshold may capture a part of defect. Please refer to step S64, "according to a position of the fourth image corresponding to the defect block, determining whether a pixel around the position have a defect to selectively expand the defect block". For example, if the center coordinate of the selected defect block in the third output image is (123, 45), the processor will find pixels surrounding the pixel of coordinate (123, 45) in the fourth output image, including pixels of coordinates (122, 45), (124, 45), (123, 43), (123, 46), and then determine whether any of these pixel in the fourth output image is a defect. If the determination result is positive, the processor will keep the defect block and pixels surrounding thereof which are also defects. In an embodiment, step S61 may generate a connected graph including the defect block by, for example, flood fill algorithm.

The processor determines which pixels in the second output image generated by step S6 are defects and further labels them. The multi-threshold generating procedure proposed in step S6 may reduce false positive labels in the image.

FIGS. 4-11 are image examples obtained after steps of FIGS. 1-3 are performed.

Please refer to FIG. 4, which is an example of the target image obtained after step S1 is performed. The target object in FIG. 4 is a printed circuit board (PCB) and a circuit component. As shown in FIG. 4, the circuit component has three pins and the middle pin is not correctly inserted into the hole of the PCB.

Please refer to FIG. 5, which is an example of the reconstruction image obtained after step S2 is performed. FIG. 5 shows that if the target object "does not have a defect", every pin of its circuit components should be inserted in to holes.

Please refer to FIG. 6, which is an example of the first difference image obtained after step S3 is performed. It can be recognized from FIG. 6 that the lower half of the first difference image has a white area, which is more recognizable than the upper half of the first difference image.

Please refer to FIG. 7, which is an example of the second difference image obtained after step S4 is performed. FIG. 7 shows the reconstruction error in pixel-scale, therefore more details can be recognized from FIG. 7 than that of FIG. 5.

Please refer to FIG. 8, which is an example of the first output image obtained after step S5 is performed. The contrast between the defective part of the circuit component and its periphery is higher in FIG. 8 than that in FIGS. 6 and 7.

Please refer to FIG. 9, which is an example of the third output image obtained after step S62 is performed. FIG. 9 is the result after using FIG. 8 and the second threshold to perform binarization.

Please refer to FIG. 10, which is an example of the fourth output image obtained after step S61 is performed. FIG. 8 is the result after using FIG. 8 and the first threshold to perform binarization. It is obvious where the defect is from FIG. 10.

Please refer to FIG. 11, which is examples of the second output image and label obtained step S64 is performed. The label is the block indicating the position of the defect in FIG. 11.

Please refer to FIG. 12, which is an example of manually labeling the defect in an image according to an embodiment of the present disclosure. It can be seen from FIG. 12 that the label obtained by using the present disclosure is very close to the ground truth.

In practice, after performing the process shown in FIG. 1, the obtained labeled image can be use in, for example, defect detection model implemented by a region-based convolutional neural network (R-CNN). The R-CNN is, for example, Fast R-CNN, Faster R-CNN, Mask R-CNN, You Only Look Once (YOLO) or Single Shot Detection (SSD).

In sum, the present disclosure proposes a method for labeling image works for both classification and detection in respect to the original image of the computer products. The present disclosure reduces the need of a large amount of (human-)labeled image data for training purposes. The present disclosure is not over-generalized so that it treats some defects as the texture pattern in normal regions. Therefore, the present disclosure reduces the false negative determinations (failing to spot abnormal samples or regions). The present disclosure mimics human perception by highlighting only anomaly while ignoring complex background, such perceptual-attention based method reduces false positives effectively.

What is claimed is:

1. A method for labeling image comprising:
   obtaining a target image of a target object;
   generating a reconstruction image according to the target image and a reconstruction model, wherein the reconstruction model is trained with a plurality of reference images and a machine learning algorithm, each of the plurality of reference images is an image of a reference object, a defect level of the reference object is in a tolerable range with an upper limit, and each of the plurality of reference objects is associated with the target object;
   generating a first difference image and a second difference image respectively by performing a first difference algorithm and a second difference algorithm respectively according to the target image and the reconstruction image; and
   generating an output image by performing a pixel-scale operation according to the first difference image and the second difference image, wherein the output image includes a label indicating a defect of the target object.

2. The method for labeling image of claim 1, wherein the reconstruction model is an auto-encoder.

3. The method for labeling image of claim 1, wherein the first difference algorithm comprises:
   generating a first feature map according to the target image and a neural network model;
   generating a second feature map according to the reconstruction image and the neural network model; and
   calculating a difference degree between the first feature map and the second feature map, wherein the first difference image comprises the difference degree.

4. The method for labeling image of claim 3, wherein the neural network model is SqueezeNet.

5. The method for labeling image of claim 3, wherein neural network model is trained by a plurality of images not associated with the target object.

6. The method for labeling image of claim 1, wherein the second difference algorithm comprises: calculating a relative error according to each pixel of the reconstruction image and the target image.

7. The method for labeling image of claim 6, wherein the relative error is a square error or an absolute error.

8. The method for labeling image of claim 1, wherein the pixel-scale operation is bitwise multiplication.

9. The method for labeling image of claim 1, wherein the output image is a first output image, and performing the pixel-scale operation to generate an output image according to the first difference image and the second difference image further comprises:
   generating a third image and a fourth image respectively by performing a binarization to the first output image respectively according to a first threshold and a second threshold, wherein the first threshold is greater than the second threshold;
   selecting a defect block in the third output image; and
   according to a position of the fourth image corresponding to the defect block, determining whether a pixel around the position have a defect to selectively expand the defect block.

* * * * *